(12) United States Patent
Harvey (10) Patent No.: US 6,368,007 B1
(45) Date of Patent: Apr. 9, 2002

(54) COLLAPSIBLE ANNULAR RETAINING ASSEMBLY

(75) Inventor: Christopher J. Harvey, Bristol (GB)

(73) Assignee: Bae Systems plc, Farnborough (GB)

( * ) Notice: Subject to any disclaimer, the term of this patent is extended or adjusted under 35 U.S.C. 154(b) by 0 days.

(21) Appl. No.: 09/434,469

(22) Filed: Nov. 5, 1999

(30) Foreign Application Priority Data

Aug. 20, 1998 (GB) .............................................. 9818084
Aug. 17, 1999 (WO) ............................... PCT/GB99/02718

(51) Int. Cl.$^7$ ................................................ F16B 37/00
(52) U.S. Cl. ....................................................... 403/260
(58) Field of Search ................................. 403/260, 261, 403/256, 257, 344, 291, 289, 150, 52, 73; 24/270, 282, 121; 248/229.13, 229.23, 228.4, 230.4, 231.51; 285/34, 35; 384/519; 244/102 A, 102 R, 100 R (56) References Cited

U.S. PATENT DOCUMENTS

| | | | | |
|---|---|---|---|---|
| 744,917 A | * | 11/1903 | Houldsworth | ............... 403/344 |
| 1,885,128 A | * | 4/1932 | Montgomery | ................ 24/270 |
| 2,267,252 A | * | 11/1941 | Pitsch | .......................... 285/34 |
| 4,083,613 A | * | 4/1978 | McGee | ....................... 403/344 |
| 4,123,095 A | * | 10/1978 | Stehlin | ....................... 285/409 |
| 4,189,251 A | | 2/1980 | Bianco | |
| 4,200,407 A | | 4/1980 | Bianco | |
| 4,328,939 A | | 5/1982 | Davies et al. | |
| 5,069,054 A | * | 12/1991 | Hladky et al. | .............. 403/344 |
| 5,069,571 A | * | 12/1991 | Matczak et al. | ............ 403/134 |
| 5,411,337 A | | 5/1995 | Bianco et al. | |

FOREIGN PATENT DOCUMENTS

| | | |
|---|---|---|
| GB | 403628 | 12/1933 |
| GB | 2 320 002 | 6/1998 |

* cited by examiner

Primary Examiner—Lynne H. Browne
Assistant Examiner—Doug Hutton
(74) Attorney, Agent, or Firm—Nixon & Vanderhye P.C.

(57) ABSTRACT

An adjustable size annular retaining assembly includes at least two substantially rigid segments (1, 2) and means (3, 4) for pivotably interconnecting the segments in end to end relationship, so that when the segments are pivotally interconnected at all but a single pair of adjoining segment ends (1b, 2b), the assembly can be contracted to a reduced size condition (5) for insertion through or into or removal through or from a confined space (6), and expanded into a desired annular size condition (7) for pivotal interconnection of said non-connected pair of adjoining segment ends (1b and 2b).

21 Claims, 7 Drawing Sheets

COLLAPSIBLE ANNULAR RETAINING ASSEMBLY

BACKGROUND OF THE INVENTION

1. Field of the Invention

This invention relates to an adjustable size annular retaining assembly suitable particularly, but not exclusively, for use in confined spaces.

2. Discussion of Prior Art

In many engineering constructions, such as aircraft wings, components are assembled together in a manner which leaves some components such as fasteners and retaining rings in confined spaces which are difficult to access for maintenance and inspection. Therefore when such components are required to be replaced, it can result in a lengthy and costly procedure, often requiring the additional removal of nearby, but unrelated components.

There is thus a need for a retaining assembly whose size is adjustable, so as to permit removal and fitting from and through confined spaces without disturbing surrounding and unrelated components.

SUMMARY OF THE INVENTION

According to the present invention there is provided an adjustable size annular retaining assembly for use in a confined space, including at least two substantially annular substantially rigid segments and means for pivotably interconnecting the segments in end to end relationship so that when the segments are pivotally interconnected at all but a single pair of adjoining segment ends the assembly can be contracted to a reduced size condition for insertion through or into or removal through or from a confined space, and expanded into a desired annular size condition for pivotal interconnection of said non-connected pair of adjoining segment ends.

Preferably said at least two substantially annular substantially rigid segments are each arcuate in profile, of substantially identical projected diameter and of suitable circumferential length so as to form an annular ring in said expanded desired annular size condition.

Conveniently, in said reduced size condition, the segment pivotably interconnecting means are such, that when the segments are pivotably interconnected at all but a single pair of adjoining segment ends, as to permit, movement, in the case of two segments, between the two segments at the interconnected segment ends in and/or out of the plane of said segments, and in the case of three or more segments, between adjoining segments, at the interconnected segment ends in the plane of the segments.

Advantageously the assembly has two segments, and the segment pivotably interconnecting means includes a lug formation at each end of a first of the two segments, an axially extending internally threaded bore in one end and a lug formation at the other end of a second of the two segments, a connecting rod with a lug formation at one end thereof and which other end thereof is externally threaded for engagement with the correspondingly threaded bore of the second of said segments, for providing said out of plane movement between the two segments by relative rotation along the thread length between the connecting rod and second of said segments, said lug formations each having at least one bore therethrough transverse to the plane of the segments and rod respectively, and two or more interconnecting pins, insertable into the transverse bores, when axially aligned, of the lug formation of the connecting pin and one lug formation of the first of said segments, and of the other lug formation of the first of said segments and the adjoining lug formation of the second of said segments, for providing said in plane movement between the two segments by pivoting of said lug formations about their associated interconnecting pins.

Preferably the first segment lug formations include at one end a forked portion, with the associated transverse bore extending therethrough, for engagement with the adjoining connecting rod lug formation, and at the other end a fork element which is offset relative to a fork element forming the lug formation of the second segment for pivotal interconnection therewith.

Conveniently, the assembly includes pin retaining means for, when said assembly is in the expanded desired annular size condition with the interconnecting pins in the axially aligned transverse bores, engaging ends thereof so as to retain the pins in their bores.

Advantageously the pin retaining means includes at least two interfaces, provided by at least two substantially annular plates, removably attachable to the segments in the expanded desired annular size condition, and/or by adjoining housings when the assembly is operatingly associated therewith.

Preferably at least one of said interconnecting pins is a threaded shank bolt and the transverse bore of the lug formation of the second of two segments is correspondingly threaded.

Conveniently the assembly has three or more segments, and the segment pivotably interconnecting means includes a lug formation at each end of each segment, each of which formations has a bore therethrough transverse to the plane of the segments, and three or more interconnecting pins, each insertable into the transverse bores, when axially aligned, of two adjoining segment end lug formations, for providing said in plane movement between adjoining segments by pivoting of said lug formations about the associated interconnecting pin.

Advantageously each lug formation includes at least one fork element, each having one of the associated transverse bores extending therethrough and being offset relative to the adjoining lug formation fork element or elements for pivotal interconnection therewith.

Preferably each substantially annular segment is internally grooved throughout its length to provide an internal channel therealong.

Conveniently the assembly includes a substantially annular retaining spring for removable location in said internal channel when said assembly is in the expanded desired annular size condition with the interconnecting pins in the axially aligned transverse bores to engage adjacent ends of the pins and thus retain them in said bores.

Advantageously the assembly includes pin retaining means for engaging the pin ends remote from the ends engaged by the spring.

Preferably the pin retaining means is an interface provided either by a substantially annular plate, removably attachable to the segments in the expanded desired annular size condition, or by an adjoining housing when the assembly is operatingly associated therewith.

Conveniently each substantially annular segment has a threaded surface so as to provide, in the expanded desired annular size condition of the assembly, a continuous or part continuous thread for receiving a threaded part to be removably connected to the assembly.

Advantageously the threaded surface is provided on an inner annular face of each substantially annular segment.

Preferably one or more of the substantially annular segments has a locating key on an outer annular face thereof, for engagement, when said assembly is inserted into an external housing and assembled into said expanded desired annular size condition, with one or more corresponding grooves in said housing, thereby retaining said assembly in a fixed axial position while the threaded part initially engages with the thread surface of the substantially annular segments.

Conveniently one or more of the substantially annular segments has a tang on an outer annular face thereof, for engagement, when said assembly is inserted into an external housing and assembled into said expanded desired annular size condition, with one or more corresponding grooves in said housing, thereby providing resistance against a reactive moment induced by engagement of the threaded part into the thread surface of the substantially annular segments, so as to maintain a fixed polar position.

Preferably the assembly has five substantially annular substantially rigid segments.

According to a further aspect of the present invention there is provided an aircraft wing and landing gear assembly having at least one landing gear structure carried on a pintle in a bearing in a bore in a pintle housing in the wing, and including an adjustable size annular retaining assembly as hereinbefore described, in the expanded desired annular size condition, with the pintle and pintle housing to retain said bearing in the bore, and for insertion or removal through the bore in the reduced size condition.

BRIEF DESCRIPTION OF THE DRAWINGS

For a better understanding of the present invention, and to show how the same may be carried into effect, reference will now be made, by way of example, to the accompanying drawings, in which.

DETAILED DISCUSSION OF THE PREFERRED EMBODIMENT

An adjustable size annular retaining assembly of the present invention as shown in FIGS. 1 to 17 of the accompanying drawings is intended for use in confined spaces and is particularly intended for use in the aerospace industry in artefacts such as aircraft. In aircraft wing mounted landing gear, for example, the landing gear leg is pivotably mounted on a pintle in a bearing in a bore in a pintle housing in the wing and retained therein by a bearing retaining nut during manufacture of the aircraft wing, and subsequent inspection or removal of the retaining nut is difficult. An adjustable size annular retaining assembly of the present invention may be used removably to retain the pintle bearing in the bore.

Figure 1:
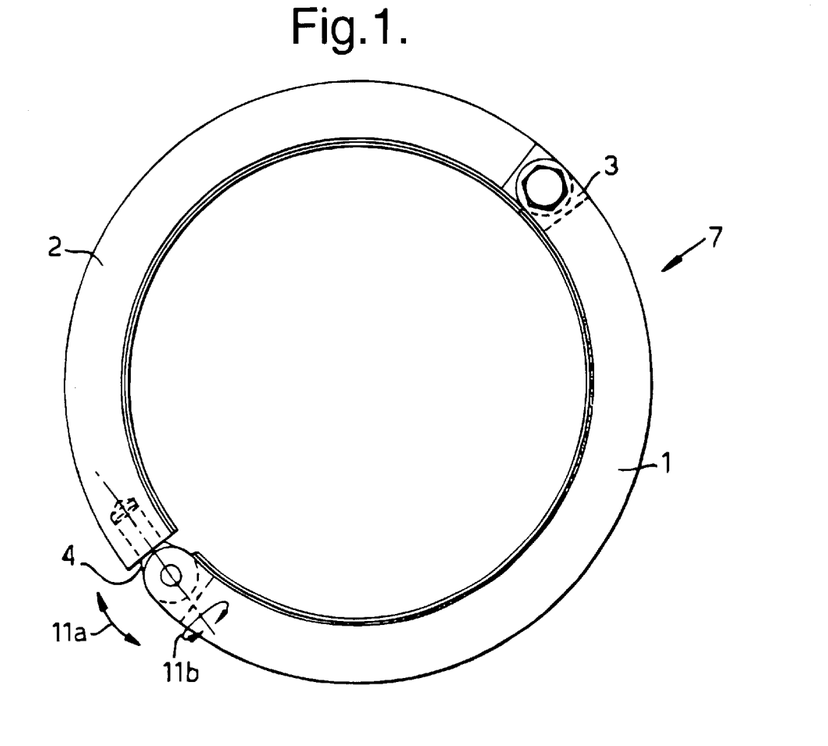
FIG. 1 is a plan view of an adjustable size retaining assembly having two segments according to a first embodiment of the present invention in its desired annular size condition.
Figure 2:
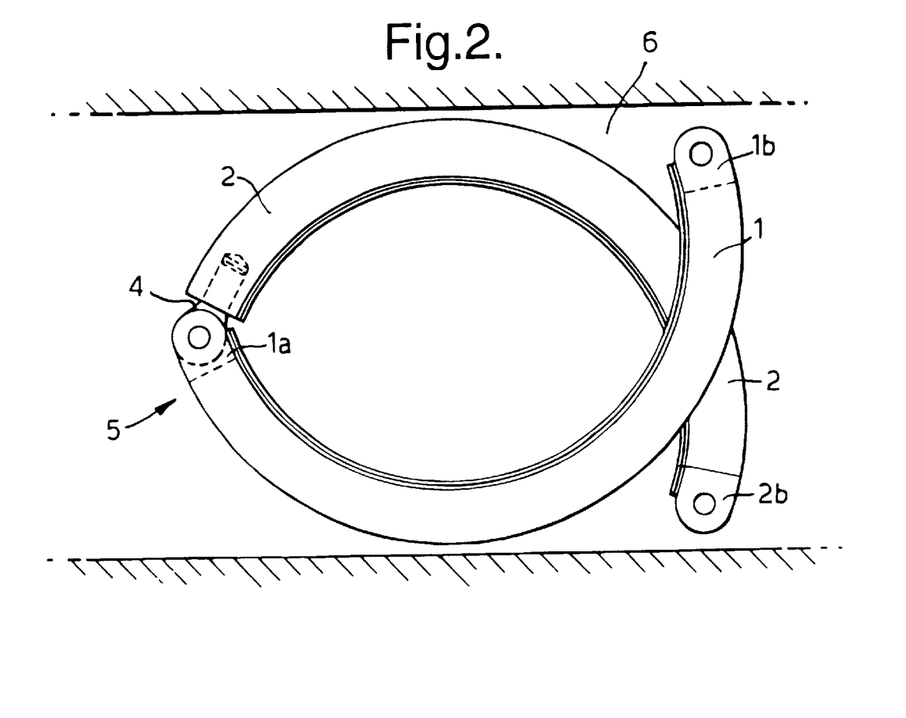
FIG. 2 is a plan view of the adjustable size retaining assembly of FIG. 1 in its reduced size condition.

Thus as shown in FIG. 1 of the accompanying drawings, an adjustable size annular retaining assembly according to a first embodiment of the present invention includes at least two substantially annular, substantially rigid segments 1 and 2, and means 3,4 for pivotably interconnecting the segments in end to end relationship, so that when the segments are pivotally interconnected at all but a single pair of adjoining segment ends, 1b and 2b, the assembly can be contracted to a reduced size condition as shown generally at 5 in FIG. 2, for insertion through or into or removal through or from a confined space 6, and expanded into a desired annular size condition as generally shown at 7 in FIG. 1, for pivotal interconnection of said non-connected pair of adjoining segment ends 1b and 2b.

As further shown in FIGS. 1 and 2 the two substantially annular, substantially rigid segments 1, 2 are each arcuate in profile, of substantially identical projected diameter and of suitable circumferential length so as to form an annular ring in the desired annular size condition 7. In the reduced size condition shown in FIG. 2 of the accompanying drawings the means 3, 4 for pivotably interconnecting the segments in end to end relationship afford movement in and/or out of the plane of the two segments 1, 2 as shown schematically by arrows 11a and 11b in FIG. 1.

The means 3, 4 are provided, as shown in FIGS. 1 to 6, by lug formations 1a and 1b at each end of segment 1, by an axially extending internally threaded bore 2a in one end of segment 2, by a lug formation 2b in the other end of segment 2, and by a connecting rod 8, with a lug formation 9 at one end, and an externally threaded shaft 10 at the other end.

Figure 3:
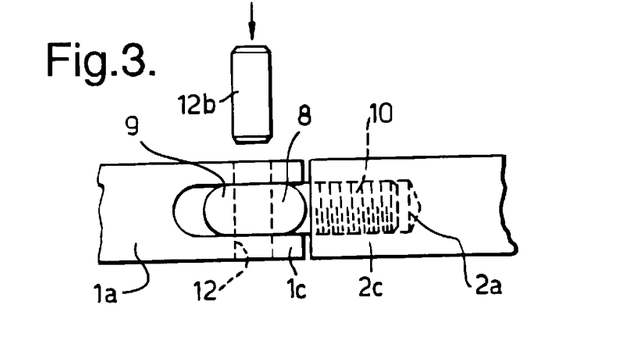
FIG. 3 is a side view, to an enlarged scale, of part of FIGS. 1 and 2 showing segment pivotably interconnecting means according to the embodiment of FIGS. 1 and 2.
Figure 6:
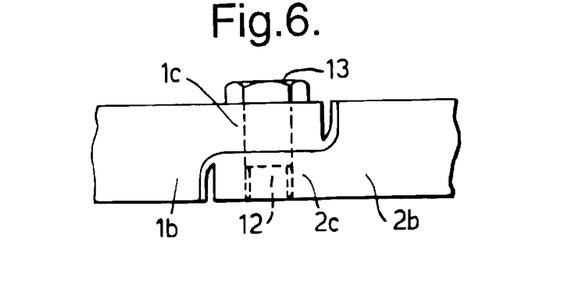
FIG. 6 is a side view of the segment pivotably interconnecting means of FIG. 5.

The threaded interface between the bore 2a and the shaft 10 as shown in FIG. 3 permits the rotation indicated by arrow 1ib in FIG. 1, thus allowing movement between the two segments and out of the plane of the two segments. The lug formation 2b of segment 2 and the lug formation 1b of segment 1 as shown in FIG. 6, the lug formation 1a of segment 1 and the lug formation 9 of connecting rod 8 as shown in FIG. 3, have bores 12 therethrough transverse to the plane of the segments and rod respectively. The pivotal interconnection between segment 1 and the connecting rod 8 is provided by a pin 12b, which is a press and clearance fit through the aligned transverse bores 12 of lug formations 1a and 9 respectively, and which allows rotation therebetween as shown by arrow 11a in FIG. 1 in the plane of the segments. The pivotal interconnection between segments 1 and 2 is provided by a threaded shank bolt 13 shown in FIGS. 6, which bolt is inserted through the bore of lug formation 1b and into the transverse bore which is correspondingly threaded of lug formation 2b, when the bores 12 are axially aligned.

Figure 4:
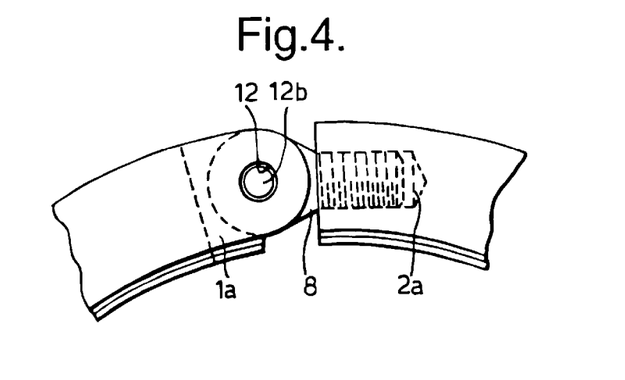
FIG. 4 is a plan view, to an enlarged scale, of part of FIGS. 1 and 2 showing the segment pivotably interconnecting means of FIG. 3.
Figure 5:
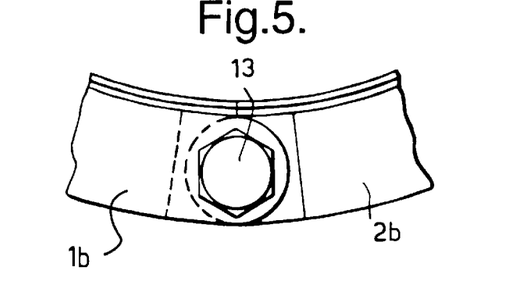
FIG. 5 is a plan view, to an enlarged scale, of part of FIGS. 1 and 2 showing another segment pivotably interconnecting means according to the embodiment of FIGS. 1 and 2.

The first segment lug formation 1a includes a forked portion 1c for engagement with the lug formation 9 of the connecting rod 8, as shown in FIGS. 3 and 4. The other lug formation 1b of the first segment 1 includes a fork element 1c, offset relative to and for engagement with a fork element 2c of the lug formation 2b of the second segment 2, as shown in FIGS. 5 and 6.

Figure 7:
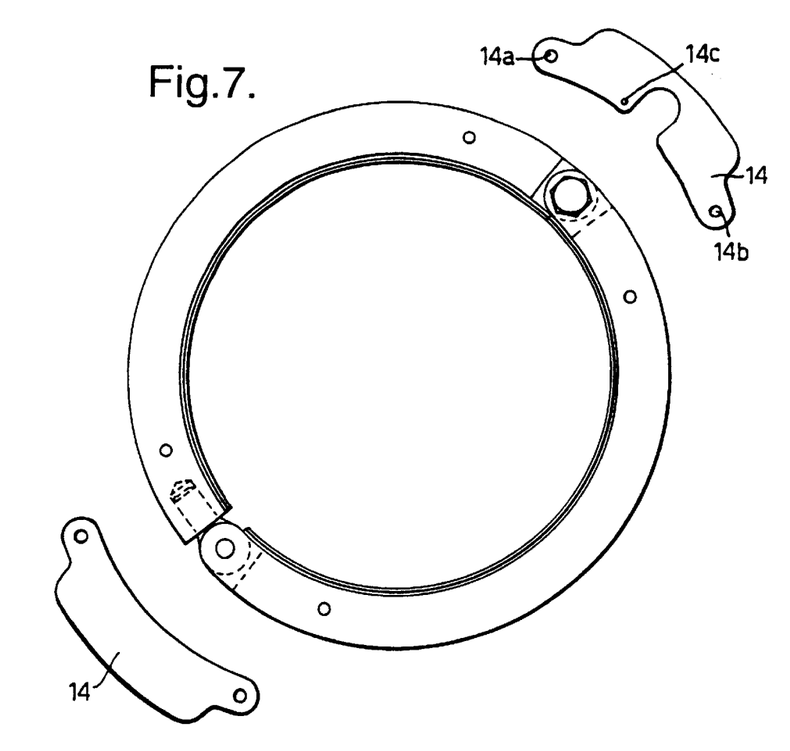
FIG. 7 is a plan view of an assembly according to FIGS. 1 to 6 shown in the desired size annular size condition with pivotable interconnecting pin retaining means illustrated disassembled from the assembly.
Figure 8:
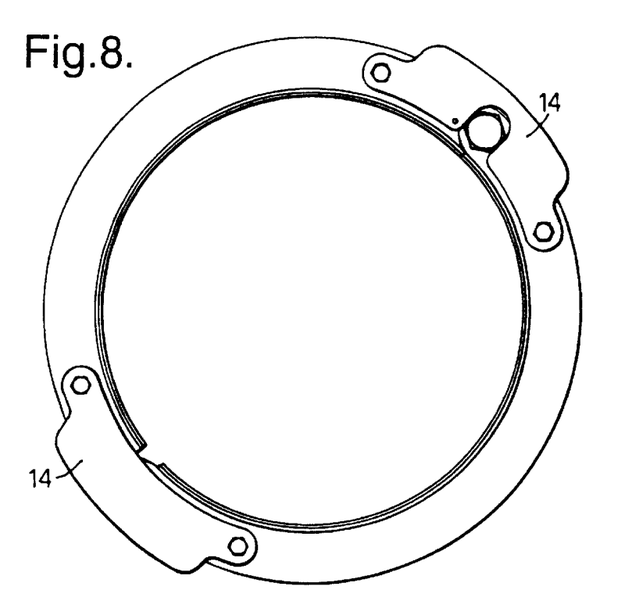
FIG. 8 is a plan view of an assembly according to FIGS. 1 to 6 shown in the desired size annular size condition with pivotable interconnecting pin retaining means illustrated assembled with the assembly.

FIGS. 7 and 8 show the removable attachment of two interface plates 14 forming part of the annular retaining assembly, whose attachment to the segments 1, 2 when the assembly is in the desired expanded condition with the interconnecting pins 12b, 13 in the axially aligned transverse bores 12 of the lug formations 1a and 9, 1b and 2b respectively, engage ends of the pins to retain the pins in their bores. The plates 14 may be secured to the segments in any convenient manner such as by screws (not shown) passing through holes 14a and 14b. Additional locking means, such as a locking wire, may be inserted into a hole 14c in one of the plates 14 to assist in securing the latter to bolt 13.

Figure 9:
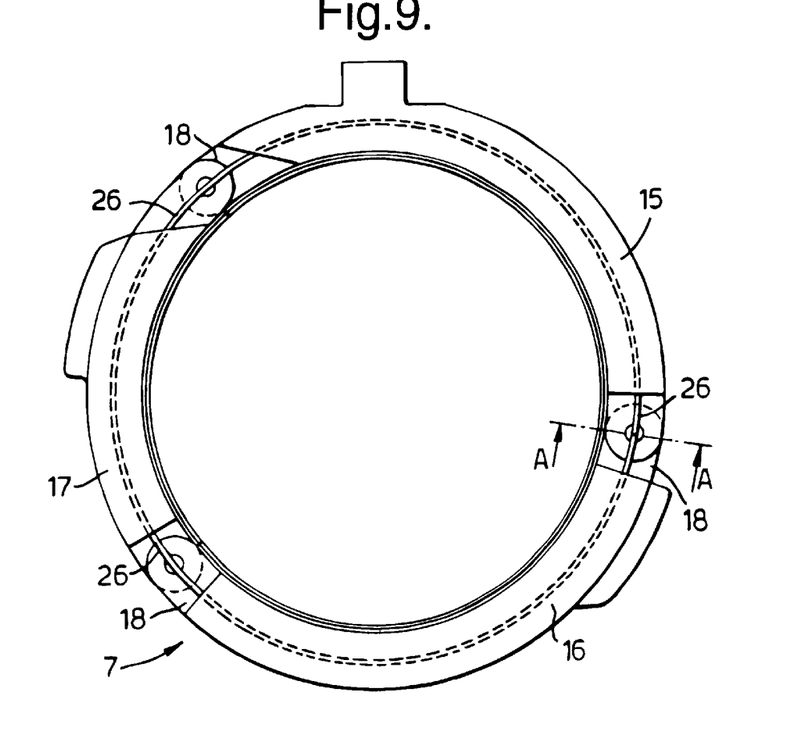
FIG. 9 is a plan view of an adjustable size annular retaining assembly according to a second embodiment of the present invention having three segments, shown in its expanded desired annular size condition.

FIG. 9 of the accompanying drawings shows an adjustable size annular retaining assembly according a second embodiment of the present invention including three substantially annular, substantially rigid segments 15, 16 and 17, and means 18 for pivotably interconnecting the segments in end to end relationship. When the segments are pivotally interconnected at all but a single pair of adjoining segment ends, 15b and 17b, the assembly can be contracted to a reduced size condition as shown generally at 5 in FIG. 10, for insertion through or into or removal through or from a confined space 6, and expanded into a desired annular size condition as generally shown at 7 in FIG. 9, for pivotal interconnection of said non-connected pair of adjoining segment ends 15b and 17b.

Figure 10:
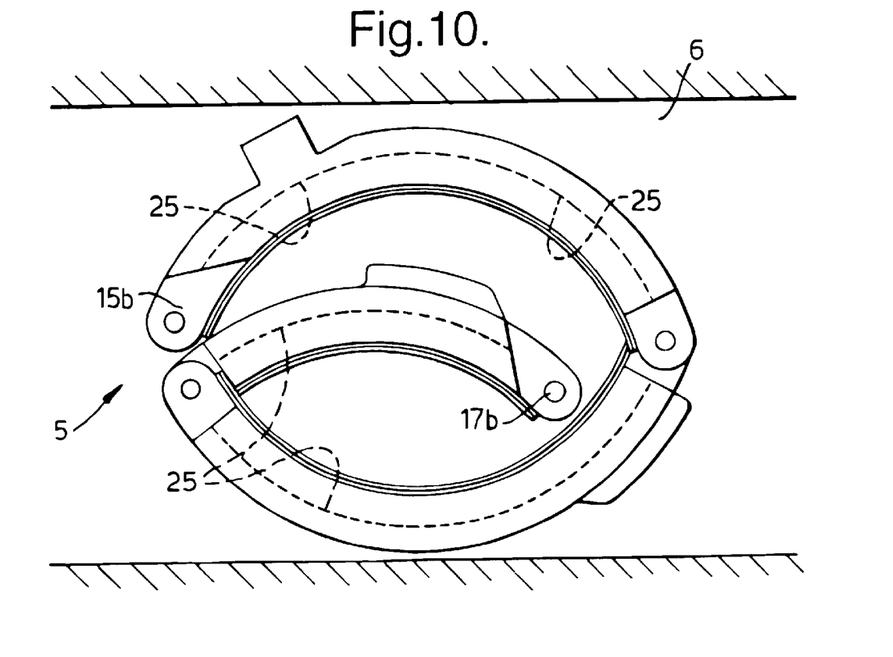
FIG. 10 is a plan view of the assembly of FIG. 9 in a reduced size condition.

As further shown in FIGS. 9 and 10 the three substantially annular, substantially rigid segments 15, 16 and 17 are each arcuate in profile, of substantially identical projected diameter and of suitable circumferential length so as to form an annular ring in the desired annular size condition 7.

Further features of the embodiment of FIGS. 9 and 10 are similar to those of the following embodiment of FIGS. 11 to 17, and like parts will be described in more detail in respect of the FIGS. 11 to 17 embodiment and given like reference numerals.

Figure 11:
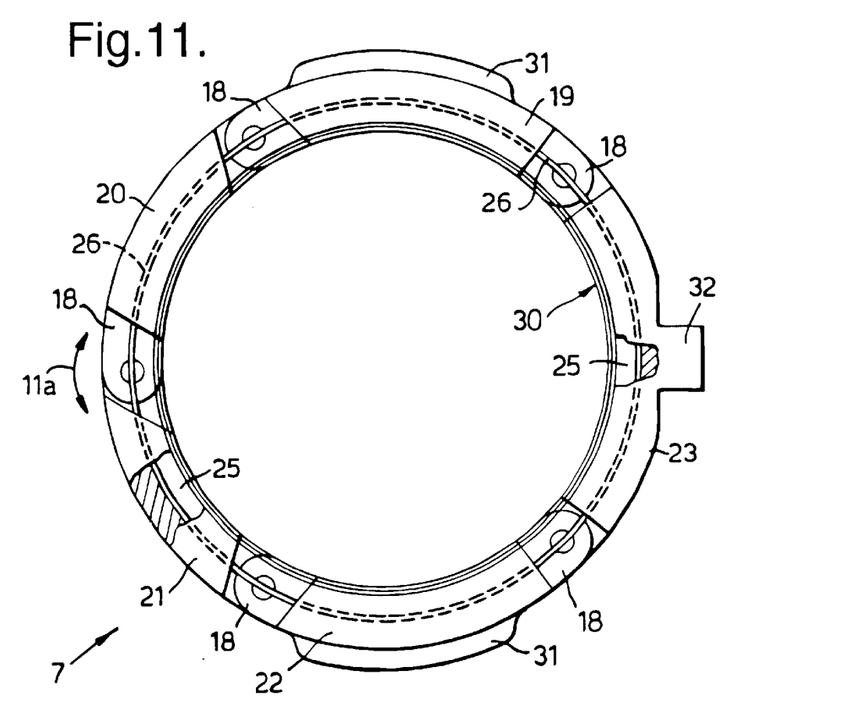
FIG. 11 is a plan view of an adjustable size annular retaining assembly according to a third embodiment of the present invention having five segments, shown in its expanded desired annular size condition.

FIG. 11 of the accompanying drawings shows an adjustable size annular retaining assembly according to a third embodiment of the present invention including five substantially annular, substantially rigid segments 19, 20, 21, 22 and 23, and means 18 for pivotably interconnecting the segments in end to end relationship. When the segments are pivotally interconnected at all but a single pair of adjoining segment ends, 20a and 21a, the assembly can be contracted to a reduced size condition as shown generally at 5 in FIG. 12, for insertion through or into or removal through or from a confined space 6, and expanded into a desired annular size condition as generally shown at 7 in FIG. 11, for pivotal interconnection of said non-connected pair of adjoining segment ends 20a and 21a.

Figure 12:
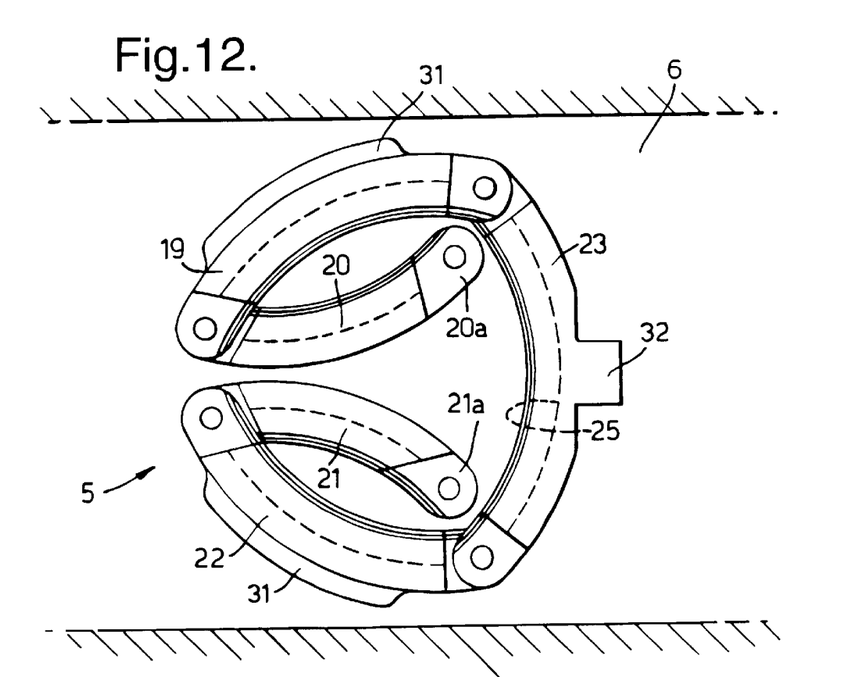
FIG. 12 is a plan view of the assembly of FIG. 11 in its reduced size condition.
Figure 17:
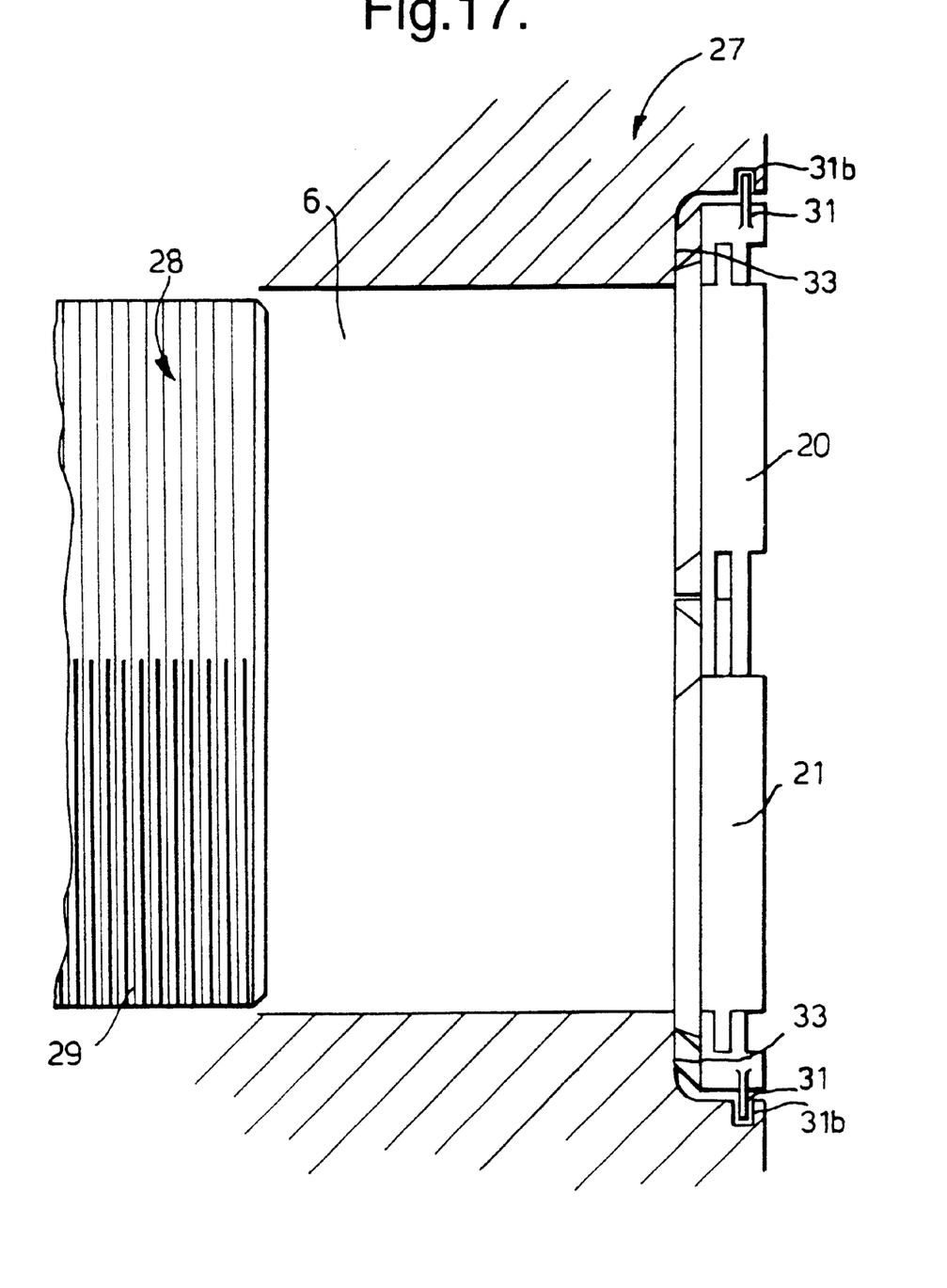
FIG. 17 is an end view of an assembly according to FIG. 11 in an expanded desired annular size condition shown in operative association with an adjoining housing.

As further shown in FIGS. 11 and 12 the five substantially annular, substantially rigid segments 19 to 23 are each arcuate in profile, of substantially identical projected diameter and of suitable circumferential length so as to form an annular ring in the desired annular size condition 7. Moreover, each annular segment has a continuous thread on its inner annular face 30 as shown in FIG. 11 to provide, in the desired annular size condition 7, a continuous thread for receiving a threaded part 28 to be removably connected to the assembly as shown in FIG. 17.

In the reduced size condition 5 shown in FIG. 12 of the accompanying drawings, the means 18 for pivotably interconnecting the segments in end to end relationship allow movement in the plane of the five segments 19 to 23 as shown schematically by arrow 11a in FIG. 11.

Figure 13:
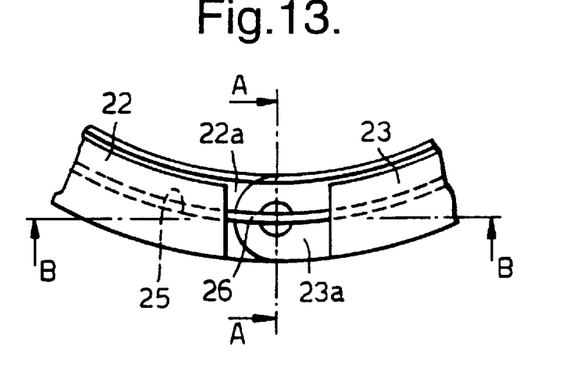
FIG. 13 is a plan view of a detail of FIG. 11 showing segment pivotably interconnecting means.
Figure 15:
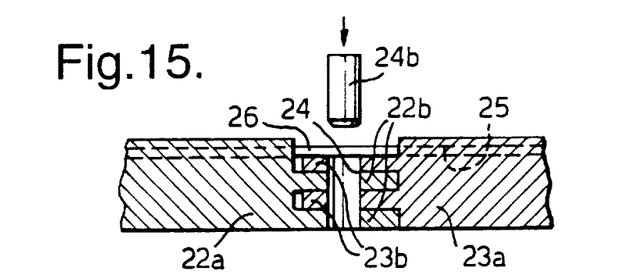
FIG. 15 is a sectional side view of segment pivotably interconnecting means taken on the line B—B in FIG. 13.

The pivotal interconnecting means are provided by lug formations 22a and 23a at each end of each segment, as shown in FIG. 13, with bores 24 therethrough transverse to the plane of the segments as shown in FIG. 15. The pivotal interconnection is provided by pins 24b, whose insertion into the axially aligned bores 24 of adjoining segments affords the in plane movement between the segments.

Each lug formation of each segment includes two forked elements 22b, as shown in FIG. 15, which are offset relative to the adjoining lug formation forked elements 23b of lug formation 23a for pivotal interconnection therewith.

Figure 14:
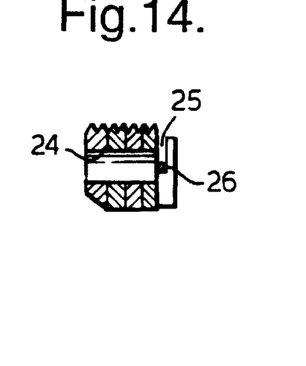
FIG. 14 is a sectional end view of segment pivotably interconnecting means taken on the line A—A in FIG. 13.
Figure 16:
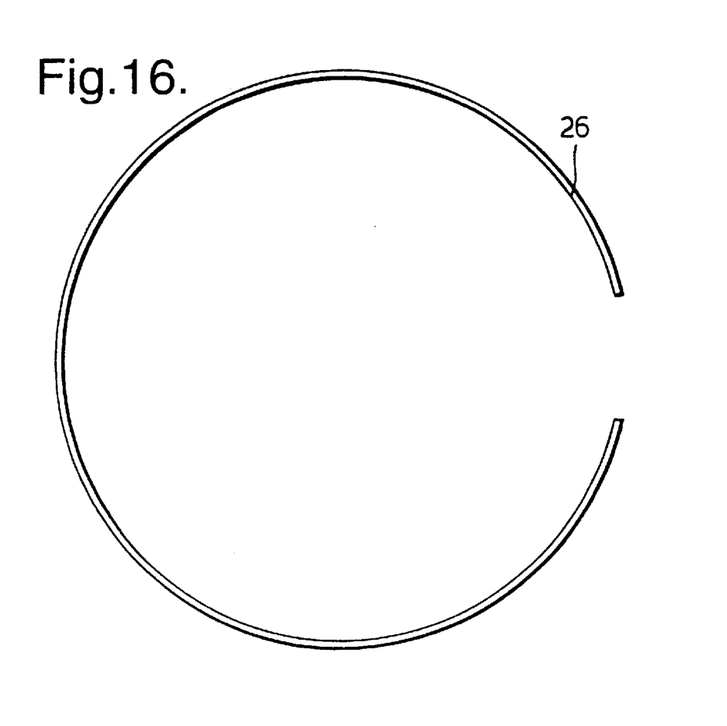
FIG. 16 is a plan view of an annular retaining spring for use in the embodiments of FIGS. 9 and 10 and 11 to 15.

Each segment 15, 16, 17, 19, 20, 21, 22, 23 has an internally grooved channel 25 throughout its length, as shown schematically in FIGS. 11, 13, 15 and in end view in FIG. 14. FIG. 16 shows a substantially annular retaining spring 26 for removable location in the internal channels 25 of adjoining segments, whose insertion therein, when the assembly is in the desired expanded condition with the interconnecting pins 24b in the axially aligned transverse bores of the lug formations, engages adjacent ends of the pins 24b and thus retains the pins in their bores.

As shown in FIGS. 11 and 12, one or more of the annular segments has a locating key 31 and a tang 32 on the outer annular face thereof. The keys 31 engage with one or more corresponding grooves 31b in the housing when the assembly is inserted into an external housing, shown generally at 27 in FIG. 17. Element 28 in FIG. 17 represents an externally threaded part, such as a bearing, to be removably connected to the assembly. The locating key 31 holds the assembly 7 steady so that the threaded surface 29 of element 28 can engage with the thread surface 30 of the substantially annular segments, and tang 32 provides a resistance against a subsequent reactive moment induced by the relative rotation between part 28 and the assembly 7.

In the first embodiment of the present invention, where the assembly includes two substantially rigid, substantially annular segments, the procedure for insertion through or into a confined space 6, and expansion into a desired annular size condition 7, requires orienting the assembly parallel to the axis of the confined region, translating the assembly in its reduced size condition 5, which size reduction is achieved by manipulation of the pivotably interconnecting means 3 and 4, as hereinabove described, a 90 degree rotation of the reduced size assembly, then a reverse manipulation of the pivotably interconnecting means 3 and 4, to achieve the desired expanded annular size condition 7. The segment ends 1b and 2b are interconnected by means of a threaded shank bolt 13, which bolt being inserted through the bore of lug formation 1b and into a correspondingly threaded bore of lug formation 2b, when said bores 12 are axially aligned. Interconnecting pin 12b, inserted into the axially aligned transverse bores 12 of lug formations 9 and 1a, is held in place by annular interfaces 14, which are attached once the assembly has achieved the desired expanded annular size condition 7.

For the second and third embodiments of the present invention the procedure for insertion through or into a confined space 6, and expansion into a desired annular size condition 7 is identical, due to the similar provision of in-plane movement between adjoining segments, and is described with reference to FIGS. 11 to 17, corresponding to the five segment embodiment. The procedure requires orienting the assembly perpendicular to its ultimate orientation in order to pass along the axis of the confined region 6, translating the assembly in its reduced size condition 5, which size reduction is achieved by a folding of segments 20 and 21 inside segments 19 and 22 as hereinabove described and shown in FIG. 12, then a reverse manipulation of segments 19 to 23 to form an annular ring structure. The segment ends 20a and 21a are connected by a typical interconnecting pin 24b to complete the expanded desired annular size condition 7 of the assembly.

In the examples shown in FIGS. 9 and 11, each annular segment has an internal groove through it's circumferential length 25, so as to provide a continuous channel through the assembly when in the desired expanded annular size condition 7. The annular diameter of this internal bore overlaps the interconnecting pins projected annulus, so that when the assembly is in the desired expanded annular size condition 7 and an annular retaining spring 26 is inserted in the internal channels 25 of successive segments, one of the two ends of the segment interconnecting pins 24b are engaged and retained in place.

FIG. 17 shows an assembly of the third embodiment of the present invention having passed through the region of confined space 6, assembled into its expanded desired annular size condition 7, and located in its associated housing 27, which for the present invention is a pintle housing for a main landing gear assembly in an aircraft wing. In this configuration, the present invention can be employed as a retaining assembly for a pintle bearing 28, whose external surface is threaded 29. Thus the inner annular face of each annular segment 19 to 23, is correspondingly threaded 30, and two of the segments 19 and 22, have a key 31 on their outer annular faces, so as to locate the assembly into the pintle housing 27, and hold the assembly 7 steady so that the bearing 28 can Linitially engage therewith. In order to provide resistance against a reactive moment subsequently induced by the relative rotation of the bearing 28 with respect to the assembly 7, there is an anti-rotation tang 32 on the outer annulus of at least one of the segments 23. The interconnecting pin ends remote from the ends engaged by the spring 26 abut against the pintle housing, shown generally at 33 in FIG. 17.

What is claimed is:

1. An adjustable size annular retaining assembly for use in a confined space, comprising:
    at least two substantially annular substantially rigid segments, each of said at least two substantially annular substantially rigid segments includes an inner threaded surface; and
    means for pivotably interconnecting the segments in an end to end relationship so that when the segments are pivotally interconnected at all but a single pair of adjoining segment ends the assembly can be contracted to a reduced size condition for insertion through or into or removal through or from a confined space, and expanded into a desired annular size condition for pivotal interconnection of said non-connected pair of adjoining segment ends.

2. An assembly according to claim 1, wherein said at least two substantially annular substantially rigid segments are each arcuate in profile, of substantially identical projected diameter and of suitable circumferential length so as to form an annular ring in said expanded desired annular size condition.

3. An assembly according to claim 1, wherein, in said reduced size condition, the segment pivotably interconnecting means are such, that when the segments are pivotably interconnected at all but a single pair of adjoining segment ends, as to permit, movement, in the case of two segments, between the two segments at the interconnected segment ends in and out of the plane of said segments, and in the case of three or more segments, between adjoining segments, at the interconnected segment ends in the plane of the segments.

4. An assembly according to claim 3, having three or more segments, wherein the segment pivotably interconnecting means includes a lug formation at each end of each segment, each of which formations has a bore therethrough transverse to the plane of the segments, and three or more interconnecting pins, each insertable into the transverse bores, when axially aligned, of two adjoining segment end lug formations, for providing said in plane movement between adjoining segments by pivoting of said lug formations about the associated interconnecting pin.

5. An assembly according to claim 4, wherein each lug formation includes at least one fork element, each having one of the associated transverse bores extending therethrough and being offset relative to the adjoining lug formation fork element or elements for pivotal interconnection therewith.

6. An assembly according to claim 5, wherein each substantially annular segment is internally grooved throughout its length to provide an internal channel therealong.

7. An assembly according to claim 1, wherein each substantially annular segment has a threaded surface so as to provide, in the expanded desired annular size condition of the assembly, a continuous or part continuous thread for receiving a threaded part to be removably connected to the assembly.

8. An assembly according to claim 7, wherein the threaded surface is provided on an inner annular face of each substantially annular segment.

9. An adjustable size annular retaining assembly for use in a confined space, comprising:
    at least two substantially annular substantially rigid segments; and
    means for pivotably interconnecting the segments in an end to end relationship so that when the segments are pivotally interconnected at all but a single pair of adjoining segment ends the assembly can be contracted to a reduced size condition for insertion through or into or removal through or from a confined space, and expanded into a desired annular size condition for pivotal interconnection of said non-connected pair of adjoining segment ends, wherein each substantially annular segment has a threaded surface so as to provide, in the expanded desired annular size condition of the assembly, a continuous or part continuous thread for receiving a threaded part to be removably connected to the assembly, wherein the threaded surface is provided on an inner annular face of each substantially annular segment, wherein one or more of the substantially annular segments has a locating key on an outer face thereof, for engagement, when said assembly is inserted into an external housing and assembled into said expanded desired annular size condition, with one or more corresponding grooves in said housing, thereby retaining said assembly in a fixed axial position while the threaded part initially engages with the threaded surface of the substantially annular segments.

10. An assembly according to claim 9 having two segments, wherein the segment pivotably interconnecting means includes a lug formation at each end of a first of the two segments, an axially extending internally threaded bore in one end and a lug formation at the other end of a second of the two segments, a connecting rod with a lug formation at one end thereof and which other end thereof is externally threaded for engagement with the correspondingly axially extending internally threaded bore of the second of said segments, for providing an out of plane movement between the two segments by relative rotation along the thread length between the connecting rod and second of said segments, said lug formations each having at least one bore therethrough transverse to the plane of the segments and rod respectively, and two or more interconnecting pins, insertable into the transverse bores, when axially aligned, of the lug formation of the connecting pin and one lug formation of the first of said segments, and of the other lug formation of the first of said segments and the adjoining lug formation of the second of said segments, for providing said in plane movement between the two segments by pivoting of said lug formations about their associated interconnecting pins.

11. An assembly according to claim 10, wherein the first segment lug formations include at one end a forked portion, with the associated transverse bore extending therethrough, for engagement with the adjoining connecting rod lug formation, and at the other end a fork element which is offset relative to a fork element forming the lug formation of the second segment for pivotal interconnection therewith.

12. An assembly according to claim 11, including pin retaining means for, when said assembly is in the expanded desired annular size condition with the interconnecting pins in the axially aligned transverse bores, engaging ends thereof so as to retain the pins in their bores.

13. An assembly according to claim 12, having five substantially annular substantially rigid segments.

14. An assembly according to claim 12, wherein the pin retaining means includes at least two interfaces, provided by at least two substantially annular plates, removably attachable to the segments in the expanded desired annular size condition, and/or by adjoining housings when the assembly is operatingly associated therewith.

15. An assembly according to claim 14, wherein at least one of said interconnecting pins is a threaded shank bolt and wherein the transverse bore of the lug formation of the second of two segments is correspondingly threaded.

16. An adjustable size annular retaining assembly for use in a confined space, comprising:
at least two substantially annular substantially rigid segments; and
means for pivotably interconnecting the segments in an end to end relationship so that when the segments are pivotally interconnected at all but a single pair of adjoining segment ends the assembly can be contracted to a reduced size condition for insertion through or into or removal through or from a confined space, and expanded into a desired annular size condition for pivotal interconnection of said non-connected pair of adjoining segment ends, wherein, in said reduced size condition, the segment pivotably interconnecting means are such, that when the segments are pivotably interconnected at all but a single pair of adjoining segment ends, as to permit, movement, in the case of two segments, between the two segments at the interconnected segment ends in and out of the plane of said segments, and in the case of two or more segments, between adjoining segments, at the interconnected segment ends in the plane of the segments, wherein the segment pivotably interconnecting means includes a lug formation at each end of each segment, each of which formations has a bore therethrough transverse to the plane of the segments, and two or more interconnecting pins, each insertable into the transverse bores, when axially aligned, of two adjoining segment end lug formations, for providing said in plane movement between adjoining segments by pivoting of said lug formations about the associated interconnecting pin, wherein each lug formation includes at least one fork element, each having one of the associated transverse bores extending therethrough and being offset relative to the adjoining lug formation fork element or elements for pivotal interconnection therewith, wherein each substantially annular segment is internally grooved through its length to provide an internal channel therealong, including a substantially annular retaining spring for removable location in said internal channels, when said assembly is in the expanded desired annular size condition with the interconnecting pins in the axially aligned transverse bores, to engage adjacent ends of the pins and thus retain them in said bores.

17. An assembly according to claim 16, including pin retaining means for engaging the pin ends remote from the ends engaged by the spring.

18. An assembly according to claim 17, wherein the pin retaining means is an interface provided either by a substantially annular plate, removably attachable to the segments in the expanded desired annular size condition, or by an adjoining housing when the assembly is operatingly associated therewith.

19. An adjustable size annular retaining assembly for use in a confined space, comprising:
at least two substantially annular substantially rigid segments; and
means for pivotably interconnecting the segments in an end to end relationship so that when the segments are pivotally interconnected at all but a single pair of adjoining segment ends the assembly can be contracted to a reduced size condition for insertion through or into or removal through or from a confined space, and expanded into a desired annular size condition for pivotal interconnection of said non-connected pair of adjoining segment ends, wherein each substantially annular segment has a threaded surface so as to provide, in the expanded desired annular size condition of the assembly, a continuous or part continuous thread for receiving a threaded part to be removably connected to the assembly, wherein the threaded surface is provided on an inner annular face of each substantially annular segment, wherein one or more of the substantially annular segments has a tang on an outer annular face thereof, for engagement, when said assembly is inserted into an external housing and assembled into said expanded desired annular size condition, with one or more corresponding grooves in said housing, thereby providing resistance against a reactive moment induced by engagement of the threaded part into the thread surface of the substantially annular segments, so as to maintain a fixed polar position.

20. An aircraft wing and landing gear assembly having at least one landing gear structure carried on a pintle in a bearing in a bore in a pintle housing in the wing, and including an adjustable size annular retaining assembly for use in a confined space, comprising:

at least two substantially annular substantially rigid segments; and means for pivotably interconnecting the segments in an end to end relationship so that when the segments are pivotally interconnected at all but a single pair of adjoining segment ends the assembly can be contracted to a reduced size condition for insertion through or into or removal through or from a confined space, and expanded into a desired annular size condition for pivotal interconnection of said non-connected pair of adjoining segment ends, said retaining assembly for engagement, in the expanded desired annular size condition, with the pintle and pintle housing to retain said bearing in the bore, and for insertion or removal through the bore in the reduced size condition.

21. An adjustable size annular retaining assembly for use in a confined space, comprising:

at least two substantially annular substantially rigid segments, each of said at least two substantially annular substantially rigid segments includes an inner threaded surface; and at least one pivot interconnecting the segments in an end to end relationship so that when the segments are pivotally interconnected at all but a single pair of adjoining segment ends the assembly can be substantially contracted radially inward to a reduced size condition for insertion through or into or removal through or from a confined space, and expanded into a desired annular size condition for pivotal interconnection of said non-connected pair of adjoining segment ends.

* * * * *